United States Patent [19]

Cooper et al.

[11] 4,133,944

[45] * Jan. 9, 1979

[54] ETHYLENE POLYMERIZATION

[75] Inventors: Richard R. Cooper, Saint Albans; Kenneth S. Whiteley, Welwyn Garden City, both of England

[73] Assignee: Imperial Chemical Industries Limited, London, England

[*] Notice: The portion of the term of this patent subsequent to Mar. 29, 1995, has been disclaimed.

[21] Appl. No.: 635,265

[22] Filed: Nov. 25, 1975

Related U.S. Application Data

[63] Continuation of Ser. No. 456,382, Mar. 29, 1974, abandoned.

[30] Foreign Application Priority Data

Mar. 29, 1973 [GB] United Kingdom ............... 15158/73

[51] Int. Cl.$^2$ ..................... C08F 10/02; C08F 10/08; C08F 10/14
[52] U.S. Cl. ..................................... 526/65; 526/104; 526/106; 526/123; 526/130; 526/154; 526/159; 526/170; 526/171; 526/348.3; 526/348.4; 526/348.5; 526/348.6
[58] Field of Search ................. 526/65, 104, 106, 123, 526/130, 154, 159, 170, 171, 350

[56] References Cited

U.S. PATENT DOCUMENTS

| | | | |
|---|---|---|---|
| 2,882,264 | 4/1959 | Barnes et al. | 260/94.9 B |
| 2,953,552 | 9/1960 | Stampa et al. | 260/94.9 E |
| 3,073,809 | 1/1963 | Kluiber et al. | 260/88.2 F |
| 3,309,350 | 3/1967 | Kelley et al. | 260/88.2 B |
| 3,654,254 | 4/1972 | Job et al. | 260/94.9 B |
| 3,732,198 | 5/1973 | Whiteley et al. | 260/88.2 F |
| 4,014,859 | 3/1977 | Cooper et al. | 526/65 |

FOREIGN PATENT DOCUMENTS 7105858 11/1971 Netherlands ............................. 526/106

*Primary Examiner*—Alan Holler
*Attorney, Agent, or Firm*—Cushman, Darby & Cushman

[57] ABSTRACT

Ethylene is polymerised or copolymerised using a transition metal catalyst at a pressure in the range 300–1000 atmospheres and a temperature of at least 100° C in the presence of a volatile inert diluent such as pentane, or at least one 1-olefine comonomer such as buten-1, or both. The catalyst can be a Ziegler type catalyst, an organo-compound of a transition metal such as a substituted silylmethyl, cyclopentadienyl, arene, norbornyl, π-allyl or benzyl compound and may be supported on a suitable support such as silica, alumina, or magnesia. Other catalysts which may be used are supported chromium or molybdenum oxides. If a solid catalyst is used it is preferred to use a material which has been finely dispersed.

12 Claims, No Drawings

ETHYLENE POLYMERIZATION

This is a continuation of application Ser. No. 456,382 filed Mar. 29, 1974, now abandoned.

The present invention relates to the preparation of polymers of ethylene.

Two general techniques of preparing polymers of ethylene are known. In one of these, ethylene at a high pressure, typically in excess of 1100 kgm/cm$^2$, is polymerised using an initiator which breaks down under the reaction conditions to form free radicals which then initiate polymerisation of the ethylene. The other technique used to polymerise ethylene is to contact the ethylene with a catalyst system including a compound of a transition metal which will hereafter be referred to as transition metal catalysts. Such catalyst systems include the Ziegler catalyst systems which comprise a mixture of a compound of a transition metal of Groups IVA to VIII, particularly Groups IVA to VIA, and an organo-compound of a non-transition metal of Groups IA to IIIA, particularly organo-aluminium compounds. Other transition metal catalysts are based on the oxides of chromium or molybdenum which are typically supported on materials such as for example silica or alumina and yet other transition metal catalyst systems include the organo-compounds of transition metals with $\pi$-allyl, cyclopentadienyl, norbornyl, benzyl, and arene groups and also compounds including groups of the type exemplified by the neopentyl and substituted silyl-methyl compounds. The Ziegler catalysts and the organo-compounds of transition metals can be used directly as polymerisation catalysts or may be supported on a suitable matrix material such as, for example, alumina, silica, or magnesia and indeed many organo-compounds of transition metals are useful polymerisation catalysts only when supported. The transition metal catalysts can be used at much lower pressures than the free-radical catalysts, typically at pressures below 40 kgm/cm$^2$.

Of the transition metal catalysts, the preferred Ziegler catalysts comprise a combination of a compound, particularly the halide, of a transition metal of Groups IVA to VIA and an organo-aluminium compound, for example VCl$_3$, VOCl$_2$ or particularly TiCl$_3$ in combination with an aluminium trialkyl or an aluminium dialkyl halide. The organo-compounds of the transition metal compounds include tris($\pi$-allyl)chromium, tris($\pi$-2-methallyl)chromium, tetrakis($\pi$-allyl)zirconium, tetrakis($\pi$-2-methallyl)zirconium, tris($\pi$-allyl)zirconium bromide, tris($\pi$-allyl)zirconium chloride, titanium tetrabenzyl, zirconium tetrabenzyl, hafnium tetrabenzyl, zirconium tetrakis(naphthylmethyl), zirconium tetrakis(4-methylbenzyl), trisbenzyl zirconium chloride, zirconium tetrakis(1-methylene-1-naphthyl), titanium tetrakis(1-methylene-1-naphthyl), zirconium tetranorbornyl, zirconium tetrakis(trimethylsilylmethyl), bis(cyclopentadienyl)chromium(II), bis($\pi$-allyl)chromium-(II), dibenzene chromium, ditoluene chromium, $\pi$-benzene chromium tricarbonyl, $\pi$-cumene chromium tricarbonyl and $\pi$-cycloheptatriene chromium tricarbonyl. These transition metal organo-compounds, especially those of chromium, are preferably used supported on a suitable matrix material such as an inorganic oxide. Benzyl compounds and their use as polymerisation catalysts are described in British Patent Specification No. 1 265 747. Compounds of the type zirconium tetrakis(trimethylsilylmethyl) are described in British Patent Specification No. 1 265 564. The use of supported organo-transition metal compounds as polymerisation catalysts is described in British patent specification No. 1 314 828. The use of supported chromium compounds as polymerisation catalysts is described in British patent specifications Nos. 1 253 063, 1 264 393 and 1 298 220 and U.S. Pat. Specifications Nos. 3 123 571 and 3 157 712.

Typically the polymers produced by the two processes are different, the product obtained using the free radical initiator is a branced chain product whilst the product obtained using the transition metal catalysts is a linear polyethylene showing little chain branching.

According to the present invention there is provided a process for the polymerisation of ethylene wherein a mixture of 0–80% by weight of a volatile inert diluent, 0–95% by weight of at least one 1-olefine monomer, and from 5 up to 80% by weight of ethylene is introduced into a polymerisation reactor where it is contacted with a transition metal polymerisation catalyst at a temperature of from 100° C. to 350° C. and a pressure of from 300 up to 1000 kgm/cm$^2$.

The proportions of the various constituents of the mixture can be varied depending on the reaction conditions used, the components of the mixture and the nature of the product being formed. It is preferred that the reaction conditions and the mixture used are such that a single phase is maintained in the reaction zone in order to avoid polymer deposits in the reactor, but conditions whereby a single phase is not obtained can be tolerated.

The volatile inert diluent is conveniently an aliphatic hydrocarbon having from 3 to 8 carbon atoms, preferably from 3 to 6 carbon atoms, particularly butane or pentane. The 1-olefine monomer may be propylene, pentene-1, decene-1, 4-methylpentene-1 or preferably butene-1 or hexene-1, and may be the pure monomer or a mixture of monomers, including a monomer mixture obtained by oligomerisation of lower olefines, which oligomerisation mixture may include small proportions of other olefines including the higher olefines, that is those having more than 10 carbon atoms.

The polymerisation is conveniently effected at a temperature in the range 120° C. to 320° C. and particularly from 150° C. to 250° C., to 320° C. and the pressure is conveniently from 400 up to 800 kgm/cm$^2$ particularly not more than 600 kgm/cm$^2$.

Thus, according to a preferred aspect of the present invention there is provided a process for the polymerisation of ethylene wherein a mixture of 0–60% by weight of an aliphatic hydrocarbon having from 3 to 8 carbon atoms, 0–75% by weight of at least one 1-olefine which is butene-1 or hexene-1 and from 25 up to 60% by weight of ethylene is introduced into a polymerisation reactor where it is contacted with a transition metal polymerisation catalyst at a temperature of from 120° C. to 320° C. and a pressure of 400 up to 800 kgm/cm$^2$. The butene-1 or hexene-1 may be the products of a dimerisation process in which case they may contain higher oligomers or other hexene isomers.

The molecular weight of the polymer obtained in accordance with the present invention may be adjusted by the use of chain transfer agents. However, the molecular weight of the polymer product is dependent not only on the presence or absence of a chain transfer agent, but also on the reaction conditions including the temperature and the monomer being copolymerised with the ethylene, and thus it may be possible to adjust the molecular weight of the polymer product without using a chain transfer agent. If it is desired to use a chain transfer agent, hydrogen is suitable for use as such a material. It may be necessary to select the reaction conditions to give a polymer having the desired molecular weight, for example, to obtain a high molecular weight ethylene/butene-1 copolymer of high butene-1 content it is necessary to operate at the lower end of the temperature range.

It will be appreciated that the mixture will contain ethylene and at least one of the other components, and may contain, in addition, a chain transfer agent. If an ethylene homopolymer is to be prepared, the mixture will contain ethylene and the volatile inert diluent only, and may optionally contain a chain transfer agent such as hydrogen, to give a linear polyethylene as the product. If a copolymer is to be prepared, the mixture will contain ethylene and a 1-olefine monomer or a mixture of monomers, and may also contain the inert diluent but this will depend on the proportion of the 1-olefine monomers which is present. The characteristics of the copolymer obtained will depend on the comonomer and the proportion of comonomer which is present and can vary from a polymer which is similar to linear polyethylene, one similar to branched chain polyethylene, one similar to copolymers of ethylene and vinyl acetate or a polymer having rubbery properties, as the proportion of comonomer is increased.

Copolymers produced by the process of the present invention generally have a better resistance to stress cracking than a polyethylene produced using a free radical catalyst and having a similar density and melt flow index. Furthermore, the copolymers generally have better tensile properties, are stiffer and do not suffer from bleeding or surface tackiness. Preferred copolymers produced in accordance with the present invention may be formed into film having higher tear strength and improved impact properties.

The catalysts used are preferably finely dispersed so that they can be used without damaging the seal on the compressors and pumps. Catalysts of the Ziegler type including a solid transition metal component can be dispersed by using the catalyst to polymerise a small proportion of one or more 1-olefine monomers under conditions to form an amorphous polymer and thereby cause dispersion of the catalyst, for example as described in British patent specifications Nos. 1 253 046; 1 295 681 and 1 295 682. Supported Ziegler catalysts may also be dispersed using a similar technique. Alternatively the solid transition metal component can be dispersed by treating it with a long chain alkanol as described in our copending cognate application 32536/71; 616/72 and 617/72 (corresponding to Belgian Pat. No. 786 203 and Dutch Patent Application No. 72 09643).

If a supported catalyst is used, this can be dispersed by a suitable grinding technique. However, it is convenient to use a dispersed catalyst which has been dispersed by contacting the catalyst or catalyst support with a polymeric dispersant.

More specifically it is preferred to use a dispersion, in an inert diluent, of a solid, transition metal, olefine polymerisation catalyst, which comprises the said catalyst and a block or a graft copolymer, at least one segment of which is adsorbed on the catalyst in the presence of the diluent, and at least one segment of which is soluble in, or solvatable by, the diluent. Such a dispersion is obtained by contacting the catalyst and the copolymer, in the presence of an inert diluent, preferably by milling. The polymer is preferably a block copolymer such as an AB copolymer of styrene and t-butyl styrene or preferably an AB polymer of styrene and isoprene. A supported catalyst which can be dispersed by this technique and used in the process of the present invention is zirconium tetrabenzyl on alumina.

The yield of polymer obtained will depend on the catalyst used, the composition of the monomer mixture, and the reaction conditions and can be as high as 100000 mole or more of monomer polymerised/mole of transition metal compound. The yields of polymer obtained will usually be such that removal of the catalyst residues from the polymer is unnecessary, but this will be dependent on the nature of the catalyst used.

It will be appreciated that the present invention offers several advantages over the low pressure processes using transition metal catalysts. Thus, the low pressure process in many cases is effected using a suspension of catalyst in an inert hydrocarbon diluent in which the olefine monomer is dissolved. This process is slow taking several hours, and uses substantial quantities of catalyst relative to the amount of polymer produced. Furthermore, in effecting polymerisation in diluent, some soluble polymer is formed, particularly when copolymers are being produced and the presence of this soluble polymer can result in a viscous slurry being obtained which is difficult to handle. With the process of the present invention, conversion is attained quickly, typically in less than four minutes, and, as previously noted, the conversion of monomer to polymer may be as high as 100000 moles or more of monomer polymerised for each mole of transition metal compound used, although this depends on the nature of the monomer mixture, the highest conversions being obtained when the 1-olefine comonomer content is low. Finally, the process is preferably carried out in a single fluid phase under conditions such that the polymer produced does not form a separate solid or liquid phase. Solutions of polymers in super-critical gas have a low viscosity, which is much less than that of the liquid phase when effecting polymerisation in a liquid diluent at low pressure, and thus it is desirable and advantageous to operate, in as far as this is possible, in the super-critical state.

The present invention also has advantages over the high pressure process using initiators which produce free radicals since the production of a wide range of products is possible and, in view of the lower pressures used, the running costs are reduced.

The polymerisation process can be carried out as a batch operation but is preferably effected on a continuous basis. When operating on a continuous basis, the process may be carried out in a continuous stirred reactor or a continuous tubular reactor. The use of a tubular reactor does not give copolymers of uniform composition but if a spread of compositions is desirable, a tubular reactor can be used to control molecular weight distribution. The process may be carried out as a single zone process using a single reactor, but for the production of many of the products it is preferred to use either a number of reactors in series, optionally linked by coolers, or a single reactor which is effectively divided internally into several zones to give a multi-zone process. It will be appreciated that in a multi-zone process the reaction conditions in each zone will be different and it may be necessary to add monomers to the different reactors or zones to adjust the monomer composition to control the characteristics of the polymer obtained in the different reactor or zones. Under the reaction conditions usually employed, the catalyst is active for only a short time of the order of several seconds, for example 10 seconds, and thus in a multi-zone process it will normally be necessary to introduce the catalyst into more than one zone. The half-life of the catalyst utilised will depend on the reaction conditions, particularly temperature, and with longer catalyst life times, longer residence times of the monomers in the reactor may be preferred. The polymer formed in the reactor or reactors may be separated from the unreacted monomers and processed using techniques similar to those used in the high pressure process but will usually be at a correspondingly lower separation pressure, for example 20 to 80 kgm/cm$^2$, preferably about 55 kgm/cm$^2$. Using the process of the present invention, removal of the catalyst residues, which is an expensive and time-consuming process in earlier processes using transition metal catalysts at low pressure, may be omitted. The mixture of unreacted monomer(s) and inert diluent, if present, is mixed with a further quantity of the same monomer(s), and diluent and/or chain transfer agent if necessary, repressurised and recycled to the reactor. As noted previously, the further quantity of monomer(s) and diluent, if any, added should have a composition to restore the composition of the mixture to that of the original feed and in general this further quantity of monomer(s) will have a composition corresponding closely to that of the polymer separated from the polymerisation vessel.

The process of the invention is preferably carried out on a continuous basis with separation of unreacted gases from the polymer and recycling of these gases to the polymerisation reactor. In such a process the recycled gases are cooled and recompressed before being returned to the polymerisation reactor. If catalyst species are present in the recycled gases, polymerisation may continue in the recycle system and this can lead to the deposition of polymer and consequential blocking of the system, particularly in the recycle gas cooler. Accordingly, in carrying out the present process on a continuous basis with recycle of the unreacted gases, it is preferred to use a catalyst which, under the conditions of pressure and temperature in the polymerisation reactor, produces few, if any, catalytic species which are carried over with the unreacted gases separated from the polymer and thus minimises the formation of polymer in parts of the system external to the polymerisation reactor.

Catalysts which produce few, if any, species which are carried over and initiate polymerisation in parts of the system external to the polymerisation reactor are generally non-volatile single component catalysts especially single-component catalysts supported on a suitable support material. The organo-compounds of the transition metals when supported give few species which are carried over and within this class of catalyst system we particularly prefer to use the benzyl and substituted silylmethyl derivatives such as zirconium tetrabenzyl or zirconium tetrakis(trimethylsilylmethyl) on silica or alumina.

If the polymer to be prepared is a copolymer of ethylene and butene-1, instead of adding a mixture of ethylene and butene-1 to the mixture of unreacted monomers, and optionally inert diluent, only a feed of fresh ethylene need be provided, a dimerisation step being used in order to generate the required quantity of butene-1. The dimerisation may be effected in the polymerisation reactor, to give both polymerisation and dimerisation simultaneously, or in a separate stage before the polymerisation reactor, in which case some, or all of the fresh ethylene may be subjected to the dimerisation step before being mixed with the unreacted monomers. Any known dimerisation catalyst which is capable of dimerising ethylene to give predominantly butene-1 may be used but such catalysts should be selected to give the desired amount of conversion under the particular reaction conditions, and in the polymerisation reactor these may be chosen to give the optimum polymerisation conditions rather than the optimum dimerisation conditions. A convenient dimerisation catalyst is of the type titanium-alkoxide and aluminium alkyl such as titanium(butoxide) and aluminium triethyl. It will be appreciated that many dimerisation catalysts also give oligomerisation and thus in addition to butene-1, higher olefines may also be produced which, if polymerisable, will be incorporated into the polymer product.

The polymerisation catalyst is introduced by injecting it as a fine dispersion in a suitable inert liquid directly into the reactor. Suitable liquids include, for example, white spirit, hydrocarbon oils, pentane, hexane, heptane, toluene, higher branched saturated aliphatic hydrocarbons and mixtures of such liquids, for example a mixture of branched saturated aliphatic hydrocarbons having a boiling point in the range 168°–187° C. The dispersion is kept out of contact with water and air, preferably under a nitrogen blanket, before it is introduced into the reactor and the ethylene and other monomer or monomers and any diluent also should be essentially free of water and oxygen.

Into the ethylene polymers and copolymers produced in accordance with this invention can be blended, as desired, various additives such as antioxidants, U.V. stabilisers, sulphur compounds, phosphorus compounds, dyes, pigments, fillers, antistatic agents, flame retardants and antacids.

The following examples are illustrative of the present invention.

Preparation of dispersed TiCl$_3$

The titanium trichloride catalyst component was prepared by reaction of TiCl$_4$ and aluminium ethyl sesquichloride in a purified hydrocarbon fraction comprising a mixture of branched saturated aliphatic hydrocarbons having a boiling point in the range 170°–190° C. A solution of the sesquichloride in this diluent was added gradually drop by drop, with stirring, to a solution of TiCl$_4$ in the same diluent over a period of several hours, the temperature being held at 0° C. The molar ratio of total aluminium to titanium was approximately 1.6:1. The resulting slurry containing TiCl$_3$ was subsequently heated for a period at 95° C. The TiCl$_3$ was then washed several times with fresh quantities of the diluent. To a slurry of the titanium trichloride precipitate was added aluminium diethyl chloride in a molar proportion of aluminium to titanium of 4:1. This system was then used to polymerise 4 moles of decene-1 per mole of titanium by introducing the monomer under ambient temperature conditions and allowing polymerisation to occur without the application of external heating. A finely dispersed catalyst (hereafter identified as catalyst "A") was obtained which was used to polymerise ethylene as described hereafter.

Preparation of dispersed supported zirconium tetrabenzyl

A slurry, in toluene, of zirconium tetrabenzyl supported on alumina (γ-alumina of particle size substantially all in the range 50 to 150 microns, supplied by Koninklijke Zwavelzuurfabrieken v/h Ketjen NV and freed from water by heating at 500° C. for two hours in an open tube and then degassing at ambient temperature at a pressure of not more than $10^{-4}$ γ) and containing 44 gm of alumina having a loading of 0.5 mM/gm of zirconium tetrabenzyl, was filtered and dried under vacuum. The dried catalyst was slurried in 250 cm$^3$ of a dispersion, in heptane, of an isoprene-styrene AB block copolymer (styrene content 57 mole %) containing 160 gm/liter of the copolymer. The copolymer had a weight average molecular weight of 37000 and the ratio $M_w/M_n$ was 1.45. (The molecular weights and distribution were determined by gel permeation chromatography.)

The mixture was introduced into a one liter porcelain ball mill containing 1500 gm of alumina balls of ⅜ inch diameter. The mill was sealed and rotated for 16 hours at 72 rpm. A sample of the mill contents was examined for degree of dispersion, when flocculation was observed to occur. A further 70 cm$^3$ of the copolymer dispersion were added and the mill was rotated for another one hour after which the catalyst was found to be satisfactorily dispersed. The dispersed catalyst (hereafter referred to as catalyst "B1") was then used to polymerise ethylene as hereafter described.

A further series of supported zirconium tetrabenzyl catalysts, and one supported titanium tetrabenzyl catalyst, was dispersed using the technique as generally described above, the details being given in Table 1. In all cases, 240 cm$^3$ of a dispersion of an isoprene/styrene AB block copolymer were used and milling was effected for 24 hours at 100 rpm.

TABLE 1

| Catalyst Reference | Loading (mM transition metal/gm alumina) | Copolymer Wt alumina | Styrene Content (Mole %) | Conc$^n$ (g/l) | $M_w$ |
|---|---|---|---|---|---|
| B2 | 0.7 | 21 | 57 | 240 | 18000 |
| B3 | 0.15 | 29 | 57 | 240 | 18000 |
| B4 | 0.4 | 26 | 57 | 240 | 18000 |
| B5 | 0.15 | 28 | 57 | 240 | 18000 |
| B6 | 0.4 | 24 | 57 | 240 | 18000 |
| B7 | 0.8 | 32 | 57 | 250 | 30000 |
| B8 | 0.7 | 20 | 48 | 146 | 12000 |
| B9 | 0.5* | 29 | 48 | 146 | 12000 |
| B10 | 0.6 | 30 | 57 | 120 | 15000 |
| B11 | 0.6** | 30 | 57 | 125 | 15000 |

Notes to Table 1
*The catalyst in this case was supported titanium tetrabenzyl, in all other cases supported zirconium tetrabenzyl was used.
**After milling for 24 hours at 100 rpm, a further 85 mols of a dispersion of the same copolymer was added (concentraton 250 g/l) and milling was carried out for a further two hours.

Dispersion of supported vanadium chloride 22 g of magnesium oxide, prepared by heating magnesium hydroxide for 2 hours at 400° C. in an open tube were degassed under vacuum and then slurried under nitrogen with 530 cm$^3$ of a mixture of saturated aliphatic $C_{12}$ isomers. 22 mM of aluminium triethyl were added and the mixture was stirred for 2 hours. 4mM of vanadium tetrachloride were then added and stirring was continued for a further 4 hours at room temperature. The mixture was allowed to stand overnight when the supported catalyst settled leaving a colourless supernatent liquid. 50 mls of decene-1 were then added and the catalyst was stirred at 60° C. for 3 hours to polymerise the decene-1. A viscous suspension was formed which was syringeable, and did not settle overnight. This catalyst system will be hereafter referred to as catalyst "C".

EXAMPLES 1 to 49

Ethylene was polymerised or copolymerised in a continuous stirred autoclave reactor using the reaction conditions indicated in Table 2. The ethylene contained other components as indicated in Table 2. The rate of introduction of the catalyst into the reactor is also indicated. The dispersions of the various catalysts were diluted with cyclohexene or isooctane prior to being introduced into the reactor. In some cases aluminium trialkyls were mixed with the catalyst before it was introduced into the reactor.

The properties of some of the polymers obtained are set out in Table 3. The melt flow index (MFI) of the polymer was measured using the method of ASTM Method 1238-62T using a 2.16 kgm weight at 190° C. The density and tensile measurements were carried out on compression mouldings which had been annealed for one hour at 100° C. The density was measured using a density gradient column. The tensile properties were determined using specimens formed using a cutter of the type specified in B.S. 903 Part A2 using an effective gauge length of 0.75 inch (instead of one inch). The tests were performed using a draw rate of 400% per minute.

The stress exponent is defined by the following ratio:

$$\text{Stress exponent} = \frac{\text{Log } MFI_5 - \text{Log } MFI_{2.16}}{\text{Log } 5 - \text{Log } 2.16}$$

$MFI_5$ and $MFI_{2.16}$ are the melt flow indices measured using weights of 5 kgms and 2.16 kgms respectively, at a temperature of 190° C.

The flexural modulus was a 60 sec modulus measurement using 1/16 inch thick strip (compression moulded and annealed for 1 hour at 100° C.) and measured at 1% strain at 20° C.

The environmental stress cracking resistance was determined in accordance with ASTM Test D1693-66 on samples 1/8 inch thick with a 0.020 inch deep notch. The time taken for half the specimens to crack when immersed in 'Lissapol' N (a condensation product of ethylene oxide with an alkyl phenol) at 50° C. was noted.

Table 3 also includes for comparative purposes the properties of a number of free radical polyethylenes of similar density and MFI.

The polymer products of Examples 16 and 17 were formed into tubular blown film. Films were also formed from comparative polymers B, C, D and H and also from a blend of high density and low density polyethylene having an MFI of 1.0 and containing 30 weight % of the high density polymer (identified as "Blend").

The films were produced under similar conditions using a 1¼ inch horizontal extruder with an annular die of diameter of 2¼ inches having a die gap of 0.040 inch. The polymers were fed at 120 gm/min and the extrusion temperature was maintained in the range 160–200° C. The tubular film was blown to give a film of 8 inches lay flat width, and a film thickness of 30 microns.

TABLE 2

| Ex. No. | Polymerisation Conditions Pressure (Kgm cm$^{-2}$) | Temp (°C) | Feed Rate$^{(a)}$ (Kgm hr$^{-1}$l$^{-1}$) | Diluent or Comonomer | Ethylene Content (Wt %) | Catalyst Type$^{(b)}$ | Feed Rate (mM hr$^{-1}$l$^{-1}$ of transition metal) | Concentration (mM transition metal/l) | Polymerisation Efficiency (gm polymer mM transition metal) | Mole % Hydrogen on ethylene in feed |
|---|---|---|---|---|---|---|---|---|---|---|
| 1 | 900 | 200 | 22 | Pentane | 29 | A | 2.3 | 2.4 | 1050 | 0.9 |
| 2 | 600 | 200 | 22 | Pentane | 29 | A | 2.6 | 2.5 | 1000 | 0.7 |
| 3 | 400 | 200 | 22 | Pentane | 29 | A | 2.6 | 2.0 | 950 | 0.7 |
| 4 | 700 | 200 | 23 | Pentane | 40 | A | 1.4 | 1.7 | 1850 | 0.6 |
| 5 | 880 | 200 | 24 | Butene-1 | 53 | A1 | 1.1 | 0.6 | 2400 | 0.4 |
| 6 | 600 | 180 | 24 | Butene-1 | 32 | A1 | 0.55 | 0.8 | 3100 | Nil |
| 7 | 600 | 200 | 22 | Butene-1 | 36 | A1 | 0.55 | 0.8 | 3400 | Nil |
| 8 | 600 | 220 | 23 | Butene-1 | 36 | A1 | 1.2 | 1.2 | 2000 | Nil |
| 9 | 600 | 240 | 24 | Butene-1 | 36 | A1 | 4.7 | 5.8 | 600 | Nil |
| 10 | 600 | 200 | 23 | Butene-1 | 25 | A1 | 4.2 | 0.8 | 2200 | 0.4 |
| 11 | 600 | 200 | 26 | Butene-1 | 22 | A1 | 4.8 | 4.2 | 600 | Nil |
| 12 | 600 | 200 | 22 | Hexane-1 | 27 | A | 2.3 | 3.3 | 1050 | 0.3 |
| 13 | 600 | 200 | 39 | Hexane-1 | 31 | A | 5.0 | 6.2 | 850 | 0.3 |
| 14 | 600 | 200 | 17 | Hexane-1 | 36 | A | 1.9 | 3.1 | 1000 | 0.4 |
| 15 | 750 | 200 | 28 | Hexane-1 | 52 | A | 1.9 | 1.5 | 1650 | 0.4 |
| 16 | 600 | 200 | 30 | Hexane-1 | 22 | A6 | 3.0 | 6.4 | 500 | 0.3 |
| 17 | 700 | 200 | 34 | Hexane-1 | 32 | A6 | 3.1 | 5.6 | 600 | 0.4 |
| 18 | 600 | 200 | 30 | Hexane-1 | 22 | A6 | 3.9 | 6.4 | 500 | 0.6 |
| 19 | 600 | 200 | 30 | Hexane-1 | 23 | A6 | 3.8 | 6.4 | 550 | 0.9 |
| 20 | 600 | 220 | 21 | Hexane-1 | 23 | A | 4.7 | 6.2 | 500 | 0.2 |
| 21 | 600 | 220 | 25 | Hexane-1 | 27 | A2 | 1.6 | 2.0 | 1700 | 0.2 |
| 22 | 600 | 200 | 24 | Hexane-1 | 27 | A3 | 1.0 | 1.5 | 2500 | 0.2 |
| 23 | 600 | 200 | 24 | Hexane-1 | 29 | A4 | 0.8 | 1.5 | 3000 | 0.2 |
| 24 | 600 | 240 | 20 | Hexane-1 | 23 | A1 | 2.8 | 5.9 | 800 | 0.2 |
| 25 | 600 | 180 | 22 | Hexane-1 | 29 | A5 | 0.5 | 1.0 | 3700 | 0.2 |
| 26 | 600 | 160 | 23 | Hexane-1 | 31 | A5 | 0.4 | 1.0 | 4100 | 0.2 |
| 27 | 600 | 200 | 21 | Hexane-1 | 27 | A6 | 2.5 | 2.4 | 850 | 3.0 |
| 28 | 400 | 160 | 26 | Hexane-1 | 21 | A6 | 3.8 | 4.1 | 300 | Nil |
| 29 | 600 | 200 | 21 | 4-Methyl-Pentene-1 | 27 | A | 2.0 | 5.1 | 1150 | 0.4 |
| 30 | 1000 | 200 | 30 | Decene-1 | 38 | A6 | 2.0 | 2.5 | 1500 | 0.2 |
| 31 | 600 | 195 | 14 | Hexane-1 | 28 | C1 | 1.3 | 1.3 | 650 | 0.2 |
| 32 | 600 | 200 | 21 | Hexane-1 | 25 | B1 | 7.0 | 20 | 240 | 0.2 |
| 33 | 600 | 220 | 20 | Hexane-1 | 26 | B1 | 6.0 | 20 | 300 | 0.2 |
| 34 | 600 | 240 | 20 | Hexane-1 | 26 | B1 | 6.5 | 20 | 300 | 0.2 |
| 35 | 600 | 200 | 23 | Butene-1 | 26 | B9 | 2.0 | 3.0 (c) | 1030 | 0.5 |
| 36 | 700 | 200 | 23 | Butene-1 | 34 | B9 | 1.4 | 1.8 (c) | 1410 | 1.6 |
| 37 | 1000 | 200 | 24 | Butene-1 | 52 | B9 | 1.2 | 1.8 (c) | 1450 | 2.8 |
| 38 | 700 | 200 | 23 | Butene-1 | 35 | B10 | 1.4 | 2.4 (c) | 1570 | 0.7 |
| 39 | 600 | 200 | 23 | Butene-1 | 27 | B8 | 1.7 | 2.6 (c) | 1330 | 0.5 |
| 40 | 600 | 200 | 24 | Butene-1 | 28 | B5 | 2.2 | 5.3 | 1000 | 0.6 |
| 41 | 700 | 200 | 23 | Butene-1 | 35 | B3 | 1.5 | 4.0 | 1560 | 0.8 |
| 42 | 600 | 220 | 23 | Butene-1 | 37 | B2 | 2.4 | 4.2 | 900 | 0.6 |
| 43 | 600 | 260 | 24 | Butene-1 | 28 | B8 | 9.4 | 8.8 | 380 | 0.1 |
| 44 | 600 | 200 | 23 | Butene-1 | 28 | B6 | 3.4 | 7.8 | 700 | 0.7 |
| 45 | 700 | 220 | 23 | Butene-1 | 35 | B4 | 2.2 | 3.5 | 1150 | 0.6 |
| 46 | 700 | 240 | 23 | Butene-1 | 35 | B4 | 3.0 | 3.5 | 900 | 0.3 |
| 47 | 700 | 260 | 23 | Butene-1 | 35 | B4 | 3.8 | 3.5 | 950 | 0.3 |
| 48 | 600 | 200 | 23 | Butene-1 | 28 | B7 | 3.0 | 3.5 | 900 | 0.5 |
| 49 | 600 | 200 | 21 | Pentane | 28 | B11 | 0.8 | 1.1 (c) | 2200 | 1.7 |

Notes to Table 2
a) Total feed Monomer(s) plus any diluent
b) Catalysts A, B1 to B11 and C are as defined, other catalysts are as follows:
A1 - catalyst A plus 2 mM of aluminium triethyl
A2 - catalyst A plus 3 mM of aluminium triethyl
A3 - catalyst A plus 4 mM of aluminium tri-isobutyl
A4 - catalyst A plus 4 mM of aluminium triethyl
A5 - catalyst A plus 8 mM of aluminium tri-isobutyl
A6 - catalyst A plus 6 mM of aluminium triethyl
C1 - catalyst C plus 12 mM of aluminium triethyl per mM of vanadium
c) Catalyst diluted with isooctane for these experiments

TABLE 3

| Example No. | MFI | Stress Exponent | Density (Kgm m$^{-3}$) | Wt % Comonomer | Yield Stress (MN m$^{-2}$) | Break Stress (MN m$^{-2}$) | Elongation (%) | Flexural Modulus (MN m$^{-2}$) | Environmental Stress Cracking Resistance |
|---|---|---|---|---|---|---|---|---|---|
| 1 | 3.1 | | 960 | Nil | | | | | |
| 2 | 1.6 | 1.26 | 960 | Nil | | | | | |
| 3 | 1.6 | 1.26 | 960 | Nil | | | | | |
| 4 | 1.6 | 1.24 | 959 | Nil | | | | | |
| 5 | 0.9 | 1.19 | 925 | 6 | 13.0 | 29.9 | 1050 | 280 | |
| 6 | <0.005 | | | 8 | | | | | |
| 7 | 0.03 | | | 9 | | | | | |
| 8 | 0.14 | | | 9 | | | | | |
| 9 | 0.34 | 1.30 | 917 | 10 | | | | | |
| 10 | 1.7 | 1.26 | 915 | 11 | 8.6 | 25.8 | 1150 | 160 | |
| 11 | 0.3 | | 895 | 21 | | | | | |
| 12 | 1.9 | 1.29 | 916 | 12 | 9.5 | 27.3 | 1050 | 210 | |
| 13 | 2.2 | 1.23 | 922 | 9 | 12.1 | 35.0 | 1150 | | |
| 14 | 0.9 | 1.23 | 930 | 6 | | | | | |
| 15 | 0.8 | 1.22 | 933 | 4 | | | | | |
| 16 | 2.2 | 1.27 | 921 | 10 | 11.1 | 30.5 | 1100 | 265 | |
| 17 | 1.9 | 1.24 | 930 | 6 | 14.9 | 31.6 | 1100 | 360 | |

TABLE 3-continued

| Example No. | MFI | Stress Exponent | Density (Kgm m$^{-3}$) | Wt % Comonomer | Yield Stress (MN m$^{-2}$) | Break Stress (MN m$^{-2}$) | Elongation (%) | Flexural Modulus (MN m$^{-2}$) | Environmental Stress Cracking Resistance |
|---|---|---|---|---|---|---|---|---|---|
| 18 | 6.1 | 1.29 | 921 | 10 | 11.0 | 24.9 | 1150 | 280 | >300 hours |
| 19 | 16.2 | 1.31 | 922 | 10 | 11.8 | 18.9 | 1050 | 310 | >300 hours |
| 27 | 75.0 | | | | | | | | |
| 28 | 0.005 | | | | | | | | |
| 29 | 1.4 | 1.24 | 928 | 8 | 14.9 | 34.7 | 1050 | 360 | |
| 30 | 0.1 | | | 3 | | | | | |
| 31 | 0.3 | 1.11 | 931 | 10 | | | | | |
| 32 | 0.1 | 1.39 | 943 | 8 | | | | | |
| 33 | 0.3 | 1.38 | 045 | 10 | | | | | |
| 34 | 0.7 | 1.42 | 945 | 12 | | | | | |
| 35 | 1.4 | 1.56 | 902 | 18 | 5.4 | 15.9 | 1300 | | |
| 36 | 1.2 | 1.53 | 916 | 11 | 9.3 | 22.8 | 1300 | | |
| 37 | 1.0 | 1.53 | 931 | 5 | 14.8 | 26.0 | 1100 | | |
| 38 | 1.7 | 1.38 | 925 | 8 | 12.5 | 26.4 | 1200 | | |
| 39 | 1.5 | 1.47 | 922 | 9 | 11.1 | 25.3 | 1200 | 214 | |
| 40 | 1.6 | 1.41 | 931 | 10 | 12.3 | 24.1 | 1100 | | |
| 41 | 2.0 | 1.44 | 937 | 7 | 15.2 | 24.7 | 1100 | | |
| 42 | 1.5 | 1.40 | 933 | 5 | 15.8 | 26.0 | 1100 | | |
| 43 | 1.9 | 1.44 | 930 | 8 | 12.6 | 22.9 | 1200 | | |
| 44 | 1.9 | 1.32 | 933 | 7 | 14.5 | 24.4 | 1100 | | |
| 45 | 1.8 | 1.37 | 928 | 8 | 13.6 | 24.5 | 1100 | | |
| 46 | 2.8 | 1.40 | 931 | 8 | 14.3 | 22.8 | 1100 | 281 | |
| 47 | 4.6 | 1.41 | 930 | 9 | 13.5 | 19.8 | 1100 | | |
| 48 | 1.7 | 1.43 | 934 | 7 | 15.5 | 25.1 | 1100 | | |
| 49 | 1.0 | 1.49 | 958 | Nil | 29.1 | 27.8 | 900 | | |
| A | 1.8 | 1.40 | 925 | Nil | 12.3 | 18.2 | 750 | 230 | |
| B | 2.1 | 1.58 | 920 | Nil | 11.3 | 13.6 | 650 | 180 | |
| C | 0.3 | 1.76 | 922 | Nil | 11.0 | 18.9 | 750 | | |
| D | 1.1 | | 931 | Nil | 15.5 | 14.5 | 600 | 320 | |
| E | 8.1 | 1.52 | 925 | Nil | 12.8 | 10.0 | 400 | 240 | 5 Minutes |
| F | 6.8 | 1.48 | 926 | Nil | 12.7 | 11.1 | 450 | | |
| G | 20.0 | | 924 | Nil | 12.6 | 8.9 | 100 | 230 | 15 Minutes |
| H | 2.2 | | 931 | Nil | 15.6 | 12.8 | 500 | 370 | |

A blank indicates this property was not determined

Various properties of the films obtained are set out in Table 4.

Tear strength was determined according to British Standard 2782 Method 308B.

Impact strength was measured by a falling dart method in which a hemispherically headed dart is dropped from a fixed height (26 inches) onto a disc of the film. A total of twenty drops are made at a number of dart weights and the weight of the dart (in grammes) which produces fractures in 50% of the samples tested is recorded.

Tensile measurement on the films were carried out on specimens 3/16 inch wide and approximately 1.5 inch long, which are clamped in the tensile testing machine to give a one inch length between the jaws. The tests are performed using a draw ratio of 2000% per minute (20 inches per minute). 4 specimens are tested in the machine direction and 4 in the transverse direction.

tions of a mixture of aluminium triethyl and titanium tetra-n-butoxide. These additional components act as a dimerisation catalyst and are added to the polymerisation catalyst just before it is introduced into the reactor. The conditions of polymerisation and results obtained are set out in Table 5. The conversion to butene-1 was determined by gas chromatography on the exit gases.

(c) Catalysts used were as follows:

A7 — catalyst A plus 8 mM of aluminium triethyl and 2 mM titanium tetra-n-butoxide.

A8 — catalyst A plus 16 mM of aluminium triethyl and 4 mM titanium tetra-n-butoxide.

A9 — catalyst A plus 4 mM of aluminium triethyl and 1 mM titanium tetra-n-butoxide.

In these experiments the amount of butene-1 formed is sufficient to replace that which would be used up in forming a copolymer containing from about 4 to about 10% by weight of butene-1 at the same conversion into polymer.

TABLE 4

| Polymer | Film Density (kgm m−3) | Impact Strength (gms) | | Tear Strength (gm/micron thickness) | | Break Strength (MN m$^{-2}$) | | Elongation (%) | |
|---|---|---|---|---|---|---|---|---|---|
| | | Face | Edge | Machine Direction | Transverse Direction | Machine Direction | Transverse Direction | Machine Direction | Transverse Direction |
| 16 | 920 | 120 | 105 | 11 | 13 | 29 | 29 | 900 | 950 |
| 17 | 926 | 90 | 80 | 7 | 9 | 31 | 32 | 900 | 950 |
| B | 920 | 65 | 40 | 7 | 5 | 22 | 10 | 150 | 100 |
| C | 920 | 105 | 95 | 5 | 3 | 29 | 18 | 250 | 650 |
| D | 926 | 70 | 20 | 3 | 3 | 25 | 19 | 250 | 600 |
| H | 928 | 60 | 40 | 4 | 6 | 22 | 15 | 500 | 500 |
| Blend | 930 | 15 | 15 | 0.2 | 14 | 23 | 11 | 450 | 50 |

EXAMPLES 50 TO 53

The general procedure of examples 1 to 49 was repeated using catalyst A together with various propor-

TABLE 5

| | Polymerisation Conditions | | Feed | | | Catalyst | | Polymerisation Efficiency (gm polymer/ mMTiCl$_3$) | Conversion to Polymer (wt % on total feed) | Conversion to Butene$^{-1}$ (wt % on total feed) |
|---|---|---|---|---|---|---|---|---|---|---|
| Ex. | Pressure (kgm cm$^{-2}$) | Temp (°C) | Rate (kgm hr$^{-1}$l$^{-1}$) | Diluent or Comonomer | Ethylene Content (wt %) | Type (C) | Feed Rate (mMhr$^{-1}$l$^{-1}$ of TiCl$_3$) | | | |
| 50 | 600 | 200 | 21 | Pentane | 31 | A7 | 0.6 | 3400 | 10 | 0.5 |
| 51 | 600 | 200 | 19 | Pentane | 28 | A8 | 0.9 | 2100 | 10 | 0.9 |
| 52 | 600 | 215 | 19 | Pentane | 27 | A8 | 1.4 | 1400 | 10 | 1.0 |
| 53 | 600 | 200 | 22 | Hexene$^{-1}$ | 26 | A9 | 1.2 | 1450 | 8 | 0.4 |

We claim:

1. A process for the homopolymerisation of ethylene which comprises introducing a mixture of from 20 to 80% by weight of a volatile inert diluent and correspondingly from 80 to 20% by weight of ethylene into a polymerisation reactor and in the polymerisation reactor the mixture is contacted with a transition metal polymerisation catalyst at a temperature of from 100° C. up to 350° C. and a pressure of from 300 up to 1000 kgm/cm².

2. The process of claim 1 wherein the volatile inert diluent is an aliphatic hydrocarbon having from 3 to 8 carbon atoms.

3. The process of claim 1 wherein the mixture is contacted with the transition metal polymerisation catalyst at a pressure in the range 400 up to 800 kgm/cm².

4. The process of claim 3 wherein the pressure is not more than 600 kgm/cm².

5. The process of claim 1 wherein a chain transfer agent is also introduced into the polymerisation reactor.

6. The process of claim 1 wherein the transition metal polymerisation catalyst is in a finely dispersed form.

7. The process of claim 1 wherein the transition metal polymerisation catalyst is a supported organo-compound of a transition metal.

8. The process of claim 1 which comprises effecting polymerisation in more than one zone and introducing the transition metal polymerisation catalyst into more than one zone.

9. The process according to claim 1 wherein the reaction conditions are such that a single fluid phase is obtained.

10. The process of claim 1 wherein the mixture contains from 40 to 60% by weight of an aliphatic hydrocarbon having from 3 to 8 carbon atoms and correspondingly from 60 to 40% by weight of ethylene and is contacted with the transition metal polymerisation catalyst at a temperature of from 120° C. to 320° C. and a pressure from 400 up to 800 kgm/cm².

11. A process for the copolymerisation of ethylene which comprises introducing a mixture of from 20 up to 95% by weight of at least one 1-olefine monomer and correspondingly from 80 to 5% by weight of ethylene into a polymerisation reactor in which the mixture is contacted with a transition metal polymerisation catalyst at a temperature of from 100° C. up to 350° C. and a pressure of from 300 up to 1000 kgm/cm² and in order to replace the ethylene and comonomer which have been polymerised a feed of fresh ethylene is provided and at least a part of this feed is subjected to a dimerisation step which is effected in the polymerisation reactor.

12. The process of claim 11 wherein the dimerisation step is effected using a dimerisation catalyst comprising a titanium tetra-alkoxide and an aluminium alkyl.

* * * * *